(12) United States Patent
Igawa et al.

(10) Patent No.: US 11,588,207 B2
(45) Date of Patent: Feb. 21, 2023

(54) SEPARATOR FOR ELECTROCHEMICAL ELEMENT AND ELECTROCHEMICAL ELEMENT

(71) Applicant: NIPPON KODOSHI CORPORATION, Kochi (JP)

(72) Inventors: Atsushi Igawa, Kochi (JP); Takumi Ichimura, Kochi (JP); Norihiro Wada, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 587 days.

(21) Appl. No.: 16/603,515

(22) PCT Filed: Apr. 10, 2018

(86) PCT No.: PCT/JP2018/015083
§ 371 (c)(1),
(2) Date: Oct. 7, 2019

(87) PCT Pub. No.: WO2018/193915
PCT Pub. Date: Oct. 25, 2018

(65) Prior Publication Data
US 2020/0044220 A1    Feb. 6, 2020

(30) Foreign Application Priority Data

Apr. 19, 2017  (JP) .............................. JP2017-083031

(51) Int. Cl.
*H01M 50/44*    (2021.01)
*H01G 9/02*    (2006.01)
(Continued)

(52) U.S. Cl.
CPC .............. *H01M 50/44* (2021.01); *H01G 9/02* (2013.01); *H01G 11/52* (2013.01); *H01M 10/0525* (2013.01); *H01M 50/4295* (2021.01)

(58) Field of Classification Search
CPC ............ H01M 50/44; H01M 50/4295; H01M 10/0525; H01G 9/02; H01G 11/52
See application file for complete search history.

(56) References Cited

U.S. PATENT DOCUMENTS

| 6,352,565 | B2* | 3/2002 | Suhara | ..................... | H01G 9/02 |
| | | | | | 29/25.03 |
| 2009/0017385 | A1* | 1/2009 | Harada | ............... | H01M 50/431 |
| | | | | | 429/255 |

(Continued)

FOREIGN PATENT DOCUMENTS

| EP | 3 457 420 A1 | 3/2019 |
| JP | 2000-003834 A | 1/2000 |

(Continued)

OTHER PUBLICATIONS

English machine translation of Tsukuda et al. (JP 2014053259 A) (Year: 2014).*

(Continued)

*Primary Examiner* — Sarah A. Slifka
*Assistant Examiner* — Aaron J Salter
(74) *Attorney, Agent, or Firm* — Oliff PLC

(57) ABSTRACT

A heat-resistant separator for an electrochemical element in which the thickness of the separator is reduced while maintaining the balance between the short circuit resistance, resistance, electrolyte impregnation performance, and electrolyte retention performance of the separator. A separator for an electrochemical element includes beaten cellulose fibers, wherein the value obtained by dividing the average value for the distance between the center point of a cellulose stem fiber constituting part of the separator and the center point of another cellulose stem fiber nearest to said cellulose stem fiber by the thickness of the separator is 0.80 to 1.35.

6 Claims, 1 Drawing Sheet

(51) Int. Cl.
    *H01G 11/52*     (2013.01)
    *H01M 10/0525*     (2010.01)
    *H01M 50/429*     (2021.01)

(56) References Cited

U.S. PATENT DOCUMENTS

| | | | |
|---|---|---|---|
| 2013/0280616 A1 | 10/2013 | Machii et al. | |
| 2014/0377628 A1 * | 12/2014 | Nandi | H01M 50/449 156/60 |
| 2017/0373294 A1 | 12/2017 | Fukunaga et al. | |
| 2018/0287119 A1 | 10/2018 | Igawa et al. | |

FOREIGN PATENT DOCUMENTS

| | | |
|---|---|---|
| JP | 2000-114106 A | 4/2000 |
| JP | 2000-212323 A | 8/2000 |
| JP | 2011-082148 A | 4/2011 |
| JP | 2011-171290 A | 9/2011 |
| JP | 2014053259 A * | 3/2014 |
| JP | 2014139903 A * | 7/2014 |
| JP | 5973052 B1 | 8/2016 |
| JP | 2017-069229 A | 4/2017 |
| WO | 2012/008559 A1 | 1/2012 |
| WO | 2013/054889 A1 | 4/2013 |
| WO | 2016/143801 A1 | 9/2016 |
| WO | 2017/057336 A1 | 4/2017 |
| WO | 2017/195690 A1 | 11/2017 |

OTHER PUBLICATIONS

English machine translation of Nishio et al. (JP 2014139903 A) (Year: 2014).*
May 29, 2018 Search Report issued in International Patent Application No. PCT/JP2018/015083.
Jul. 25, 2022 Office Action issued in Chinese Patent Application No. 201880024891.0.

* cited by examiner

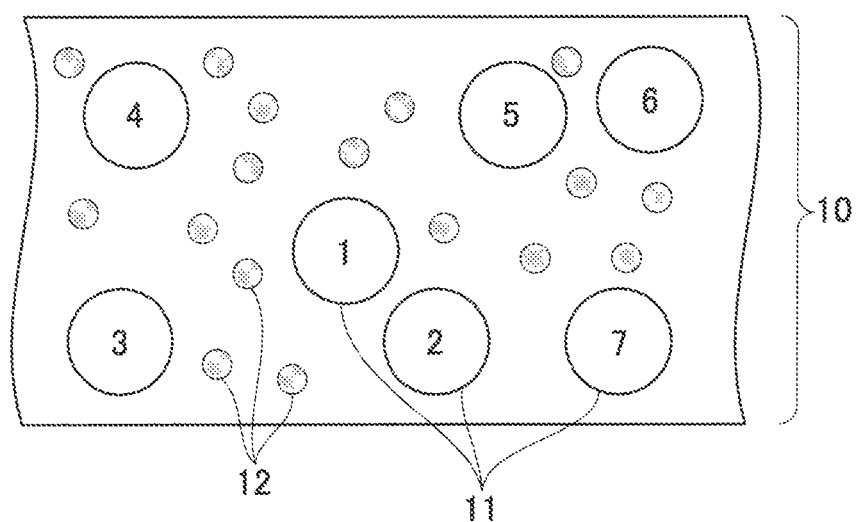

SEPARATOR FOR ELECTROCHEMICAL ELEMENT AND ELECTROCHEMICAL ELEMENT

TECHNICAL FIELD

The present invention relates to a separator for an electrochemical element and an electrochemical element using the separator for an electrochemical element.

BACKGROUND ART

Examples of electrochemical elements include aluminum electrolytic capacitors, conductive polymer aluminum solid electrolytic capacitors, conductive polymer hybrid aluminum electrolytic capacitors, electric double layer capacitors, lithium ion capacitors, lithium ion secondary batteries, and lithium primary batteries. Moreover, these electrochemical elements are adopted in number of fields including motor vehicle-related devices, digital devices, renewable energy-related devices such as wind power generation and solar power generation, and communication devices such as smart meter, and the applications thereof are expected to continuously expand in the future.

For example, in motor vehicles, a lithium ion secondary battery or an electric double layer capacitor is used for energy regeneration and an aluminum electrolytic capacitor is used for power supply to various electronic control units. Furthermore, in electric vehicles and hybrid vehicles which have attracted attention in recent years, a lithium ion secondary battery is used as a power source and the like, an electric double layer capacitor is used for energy regeneration and the like, and an aluminum electrolytic capacitor is used for control of a battery and a hybrid system serving as a power source and in an electronic control unit of direct current conversion from an external alternating current power source, and the like. Such electrochemical elements used in motor vehicles are required to exhibit high reliability since defects directly affect human life. In other words, these electrochemical elements are required to withstand vibration of the vehicle body, not to cause short circuit defect even when being used for a long time in a cold region or a high-temperature region, and also to hardly cause deterioration in performance.

In the circuit board used in electronic devices, there is a great demand for thinning and downsizing of electrochemical elements mounted. Moreover, electrochemical elements used in the power source of portable devices are also required to be used for a long time by one time of charge. For this reason, electrochemical elements such as aluminum electrolytic capacitors mounted on a board are required to have a low height and a small size for the purpose of supplying power to the chips and CPUs and smoothing the alternating current.

In addition, lithium ion secondary batteries, which are often used as a power source of portable devices, are required to have a high capacity so as to be used for a long time while having a low height and to hardly cause deterioration in performance even when being repeatedly charged and discharged.

In association with such expansion of applications and improvement in performance of the devices used, electrochemical elements are required to be improved in performance such as charge and discharge characteristics and output characteristics, to exhibit further reliability, to be downsized, and the like more than ever.

As a separator for an electrochemical element, a cellulose separator, a microporous polyolefin membrane, a separator in which a synthetic fiber nonwoven fabric is coated with an inorganic substance, and the like are used.

As the microporous polyolefin membrane separator, a separator made of polypropylene or polyethylene is used.

As the cellulose separator, natural cellulose fibers or regenerated cellulose fibers are used. As the regenerated cellulose fibers, solvent-spun cellulose fibers are used.

As the separator in which a synthetic fiber nonwoven fabric is coated with an inorganic substance, those in which nonwoven fabrics obtained by forming synthetic fibers such as polyester fibers into sheets by a wet papermaking method are coated with inorganic powders are proposed.

The main role of a separator in an electrochemical element is the separation of a pair of electrodes and the retention of the electrolyte. In order to separate a pair of electrodes, the separator is required to exhibit high shielding properties. Moreover, in order to improve the shielding property, it is required to increase the density of the separator.

In addition, thinning of the separator is also required for the purpose of downsizing (decreasing the diameter and/or decreasing the height) the electrochemical element and increasing the capacity of the electrochemical element.

In order to thin the separator for an electrochemical element, the membrane thickness of microporous polyolefin membrane separator is required to be still more thinned. Those coated with inorganic powders such as aluminum oxide have been proposed for the purpose of preventing a decrease in heat resistance and short circuit resistance to be inevitably caused by thinning of membrane thickness.

Meanwhile, in order to thin cellulose separators, a method is adopted in which the thickness of separator at the time of manufacture (papermaking) is thinned or the separator after papermaking is thinned by a linear pressure applied using a press.

In order to improve the performance of separator, for example, the techniques of Patent Literatures 1 to 5 are disclosed.

CITATION LIST

Patent Literature

Patent Literature 1: JP 2000-212323 A
Patent Literature 2: JP 2011-171290 A
Patent Literature 3: JP 2017-69229 A
Patent Literature 4: WO 2012/008559 A
Patent Literature 5: JP 2011-82148 A

SUMMARY OF INVENTION

Technical Problem

In Patent Literature 1, a microporous polyolefin membrane separator is proposed. A microporous polyolefin membrane is fabricated by a method in which a film is stretched and is thus more easily thinned as compared with a nonwoven fabric formed by the deposition of fibers. However, in a temperature environment equal to or higher than the melting point of polyolefin resins such as polypropylene and polyethylene, the microporous polyolefin membrane shrinks to close the micropores and inhibits the movement of the electrolyte inside the electrochemical element. In addition, unlike a nonwoven fabric formed by the deposition of fibers, the pores of microporous membrane are often pores penetrating from one surface to the other surface. For this reason, the short circuit resistance is diminished if the thickness of the separator is thinned. Moreover, polyolefin resins used in such a microporous membrane exhibit low electrolyte impregnation performance and low electrolyte retention performance since the raw materials themselves exhibit poor affinity for the electrolyte.

As in Patent Literature 2, a separator is also proposed in which the membrane surface is coated with an inorganic powder or heat-resistant resin fine particles in order to ameliorate the heat shrinkage and short circuit resistance of the microporous polyolefin membrane. However, it does not mean that the electrolyte impregnation performance and electrolyte retention performance of the microporous polyolefin membrane which is a substrate are improved. Furthermore, it is difficult to thin the membrane because of the manufacturing method in which the substrate is coated with an inorganic powder and the like.

In Patent Literature 3, a separator formed of a beaten solvent-spun cellulose fiber is proposed. A cellulose fiber exhibits high heat resistance and high affinity for an electrolyte and is thus an optimum raw material as a constituent material of a separator for an electrochemical element. In the case of refining the cellulose fiber which is a raw material and thinning the thickness thereof at the time of papermaking in order to thin the cellulose fiber separator, the upper limit of the filling factor of the fibers constituting the separator is limited and it is difficult to freely control the density of the separator. In a case in which the apparent filling factor is increased and thus the density is increased as the fibers are beaten and thus fibrils are generated, the resistance increases. On the other hand, the short circuit resistance deteriorates when the density is decreased. Here, as disclosed in Example 4 of Patent Literature 2 as well, there is also a method for thinning the thickness not only by the beating of cellulose fibers but also by thickness adjustment processing (calendering) of the cellulose separator. However, by this method, the resistance increases and the electrolyte impregnation performance and the electrolyte retention performance deteriorate although the short circuit resistance is improved.

In Patent Literature 4, a separator formed of a cellulose fiber and a synthetic fiber is proposed. There is disclosed a technique for suppressing variation in discharge characteristics of a lithium ion secondary battery and improving the cycle characteristics by use of this separator.

However, the electrolyte impregnation performance and electrolyte retention performance of this separator are inferior to those of the cellulose separator disclosed in Patent Literature 2 and the like since synthetic fibers exhibit lower affinity for electrolytes than cellulose fibers.

In addition, synthetic fibers to be subjected to papermaking have a large fiber diameter to a certain extent and it is thus difficult to thin the thickness of the nonwoven fabric fabricated by depositing the fibers. If it is attempted to thin the thickness of the separator by heating or compression after papermaking, synthetic fibers are pressure-bonded to one another, the pressure-bonded place is in the form of a film, and thus the resistance of the separator increases.

In Patent Literature 5, a separator in which an inorganic layer is formed by coating a nonwoven fabric formed of a polyester fiber with an inorganic powder is proposed. It is difficult to thin the thickness of such a nonwoven fabric for the same reason as that for the separator of Patent Literature 4. Here, even if short circuit resistance is secured by the inorganic layer (coating layer) and the nonwoven layer (substrate layer) is extremely thin (the amount of fibers deposited is decreased), it is difficult to thin the thickness of the separator since the thickness of the coating layer is added to the thickness of the substrate layer. Moreover, the separator coated with an inorganic layer has a concern that inorganic fine particles are detached when the separator surface is rubbed.

As described above, it has been difficult to provide a heat-resistant thin separator while maintaining the balance among the short circuit resistance, resistance, electrolyte impregnation performance, and electrolyte retention performance of the separator for an electrochemical element in order to downsize the electrochemical element.

Solution to Problem

The present invention has been made in view of the above-mentioned problems and provides a heat-resistant separator for an electrochemical element in which the thickness of the separator is decreased while maintaining the balance among the short circuit resistance, resistance, electrolyte impregnation performance, and electrolyte retention performance of the separator. In addition, the present invention provides an electrochemical element having a smaller diameter and a lower height by use of the separator for an electrochemical element.

Specifically, the present invention has the following configuration.

In other words, the separator for an electrochemical element of the present invention is a separator for an electrochemical element including a beaten cellulose fiber, in which a value obtained by dividing an average value for a distance between a center point of a cellulose stem fiber constituting the separator and a center point of another cellulose stem fiber nearest to the cellulose stem fiber by a thickness of the separator is 0.80 to 1.35.

Furthermore, a fibrillation of the separator including a cellulose fiber is preferably 7.0 to 15.0%.

Moreover, the cellulose fiber is preferably a solvent-spun cellulose fiber.

The electrochemical element of the present invention has a configuration in which the separator for an electrochemical element of the present invention is used.

In addition, the electrochemical element of the present invention can be selected from an aluminum electrolytic capacitor, an electric double layer capacitor, a lithium ion capacitor, a lithium ion secondary battery, a sodium ion secondary battery, a sodium sulfur secondary battery, a magnesium ion secondary battery, or a magnesium sulfur secondary battery.

Advantageous Effects of Invention

According to the present invention described above, it is possible to improve the short circuit resistance of the separator and to thin the thickness of the separator without impairing the resistance, electrolyte impregnation performance, and electrolyte retention performance of the separator.

Moreover, the use of the separator of the present invention can also contribute to the downsizing of an electrochemical element.

BRIEF DESCRIPTION OF DRAWINGS

FIG. 1 is a diagram for explaining a method for measuring a distance between central points of cellulose stem fibers.

DESCRIPTION OF EMBODIMENTS

The separator for an electrochemical element of the present invention is preferably a separator formed of a cellulose fiber. Among cellulose fibers, a solvent-spun cellulose fiber is more preferable from the viewpoint of decreasing the resistance of the separator. In the case of cellulose fibers, it is possible to adjust the fiber diameter to a desired value or to control the fibril generation rate to a desired value by, for example, beating the fibers.

It is difficult to thin the thickness of the separator in a case in which not cellulose fibers but synthetic fibers are used in the separator, and there is the possibility that the fibers themselves are compressed and fused to one another and the resistance increases in a case in which the synthetic fibers are subjected to thickness adjustment processing in order to thin the thickness. In addition, the electrolyte impregnation performance and electrolyte retention performance of the separator tend to deteriorate since synthetic fibers exhibit low affinity for electrolytes.

In the separator for an electrochemical element of the present invention, the value obtained by dividing the average value for the distance between the center point of a cellulose stem fiber constituting the separator and the center point of another cellulose stem fiber nearest to the cellulose stem fiber by the thickness of the separator is in a range of 0.80 to 1.35 and more preferably in a range of 0.85 to 1.25.

When the value obtained by dividing the average value of the distances between the center points of the cellulose stem fibers by the thickness of the separator is less than 0.80, the stem fibers are pressure-bonded to one another, the resistance increases, and the electrolyte impregnation performance deteriorates.

On the other hand, when the value obtained by dividing the average value of the distances between the center points of the cellulose stem fibers by the thickness of the separator is more than 1.35, the stem fibers are separated from one another, the short circuit resistance deteriorates, and the electrolyte retention performance time dependently deteriorates.

Incidentally, the term "stem fiber" as used herein refers to a fiber which is not a fibril among beaten cellulose fibers and is a fiber having a fiber diameter of 1 μm or more. In addition, a fibril is a fiber having a fiber diameter of less than 1 μm among beaten cellulose fibers.

The configuration of the separator for an electrochemical element of the present invention described above can be manufactured, for example, by beating cellulose fibers to fabricate a sheet and then adjusting the thickness of the sheet by soft calendering.

In soft calendering (pressure compression by a combination of a resin roll and a metal roll), the resin roll is significantly slightly deformed and surface compression is performed when pressure compression is performed. It is compression at the surface, thus the fibers present at the pressurized surface can relatively freely move and the stem fibers can slightly move in directions other than the thickness direction as well. In addition, there is a degree of freedom of the fibers themselves by surface compression, thus deformation and pressure deterioration of the fibers themselves constituting the separator are minor.

On the other hand, in hard calendering (pressure compression by metal rolls) which has been conventionally adopted, the metal roll is not deformed, thus linear compression is performed, the fibers constituting the separator have only freedom in the thickness direction, and deformation and pressure deterioration of the fibers themselves constituting the separator are great.

When the fibrillation of the separator is less than 7.0%, the short circuit resistance tends to deteriorate and the electrolyte retention performance also tends deteriorate even when movement of stem fibers occurs by pressure compression.

On the other hand, when the fibrillation is more than 15.0%, the movement of stem fibers hardly occurs and there is a case in which the stem fibers are pressure-bonded to one another and the resistance increases and a case in which the electrolyte impregnation performance and the electrolyte retention performance are diminished.

For this reason, the fibrillation of the separator is preferably in a range of 7.0 to 15.0%.

Furthermore, the smoothness of the sheet of separator is preferably in a range of 400 to 2500 seconds and more preferably 2000 seconds or less.

When the smoothness of the sheet is less than 400 seconds, the puncture resistance of the sheet surface is diminished and the short circuit resistance is diminished.

On the other hand, when the smoothness of the sheet is more than 2500 seconds, the separator surface has a high tendency to repel liquids like a film and the electrolyte impregnation performance deteriorates.

Incidentally, the variation (standard deviation) of the distance between the center points of the stem fibers of a cellulosic fiber is preferably 12.0 or less.

The fact that the variation in the distance between the center points of the stem fibers is more than 12.0 means that a place at which the distance between the stem fibers is near and a place at which the distance between the stem fibers is distant are unevenly distributed and places at which the short circuit resistance, electrolyte impregnation performance, and the electrolyte retention performance of the separator are poor are locally present.

The density of the separator of the present invention is not limited, and the separator can have any density. The effect of the present invention is not inhibited if the density is about 0.45 to 1.00 $g/cm^3$. It is considered that a range of about 0.50 to 0.85 $g/cm^3$ is substantially favorable in consideration of short circuit resistance and resistance.

The thickness of the separator is not particularly limited as long as it has a function as a separator and the value obtained by dividing the average distance between the center points by the thickness in the present invention satisfies the above range, but it is more preferable as the separator is thinner from the viewpoint of downsizing of the electrochemical element. It is considered that a range of about 5 to 35 μm is substantially favorable in consideration of short circuit resistance and resistance.

Hereinafter, various specific Examples, Comparative Examples and the like of the separator for an electrochemical element according to the present invention and the electrochemical element equipped with the separator for an electrochemical element will be described in detail.

Incidentally, in Examples of the present embodiment, all the separators are formed by a papermaking method, but the method for forming the separator is not limited to the papermaking method as along as the value obtained by dividing the average distance between the center point of a cellulose stem fiber constituting the separator and the center point of another cellulose stem fiber nearest to the cellulose stem fiber by the thickness of the separator is in a range of 0.80 to 1.35. For example, there is no problem even though the method is a method in which a fiber dispersion is formed into a sheet by casting and the like.

[Evaluation Method of Separator and Electrochemical Element]

The evaluation on the specific properties of the separator and electrochemical element was performed under the following conditions by the following methods.

[Thickness]

The thickness of the separator was measured by a method in which the separator is folded and piled up by 10 sheets of "5.1.3 Case of measuring thickness by folding and piling up paper" using the micrometer of "5.1.1 Measuring instruments and measuring methods a case of using outside micrometers" prescribed in "JIS C 2300-2 "Cellulose paper for electricity-Part 2: Test method 5.1 thickness"".

[Density]

The density of the separator in a bone dry condition was measured by the method prescribed in Method B of "JIS C 2300-2 "Cellulose paper for electricity-Part 2: Test method" 7.0 A Density".

[Average Distance Between Center Points and Standard Deviation of Distance Between Center Points]

The separator was cut in the width direction (CD direction), and the cross section of the separator was photographed at a magnification of 1500-fold using a scanning electron microscope. Next, the distance between the center of a cellulose stem fiber and the center of another cellulose stem fiber nearest to the cellulose stem fiber was measured. This was measured for 200 cellulose stem fibers, and the average value thereof was taken as the average distance between center points.

Thereafter, the standard deviation of the distance between center points measured was determined.

Here, a method for measuring the distance between the center points of the cellulose stem fibers will be described with reference to FIG. 1.

As illustrated in FIG. 1, a large number of cellulose stem fibers 11 and fibrils 12 are contained inside a separator 10. In FIG. 1, reference numerals 1 to 7 are given to the respective cellulose stem fibers 11.

There are cellulose stem fibers 2 to 5 around a cellulose stem fiber 1 illustrated in FIG. 1. Among these, the distance between the center point of the cellulose stem fiber 2 at the nearest distance to the cellulose stem fiber 1 and the center point of the cellulose stem fiber 1 is measured. This measurement is performed for all the cellulose stem fibers (cellulose stem fibers 1 to 7 in FIG. 1). The same measurement was repeated for 200 cellulose stem fibers, and the average value of all the measured values was taken as the average distance between center points.

Incidentally, the center of the cellulose stem fiber deformed by pressure compression and the like was taken as the gravity center.

[Fibrillation of Separator]

The fibers obtained by defiberizing the separator sheet and dispersing the fibers were subjected to the measurement using a measuring instrument prescribed in "JIS P 8226-2 "Method for measuring fiber length by pulp-automatic optical analysis method-Part 2: Non-modified method (ISO 16065-2)"".

Specifically, the value of "fibrillation" measured using "Kajaani Fiber Lab. 4" was adopted.

Incidentally, the area of fibers dispersed in water is measured and then the area of fibrils is measured. "Fibrillation" indicates the numerical value (%) represented by dividing this area of fibrils by the area of fibers.

[Surface Smoothness of Separator]

The surface smoothness of the separator was measured in conformity with "JIS P 8119 "Paper and board-Smoothness test method using Bekk smoothness tester"".

[Electrochemical Element]

A separator was interposed between both electrode materials, and these were wound to fabricate an element winding.

The respective electrochemical elements were obtained by encapsulating this element winding and an electrolyte in a case. Specifically, the respective electrochemical elements of an aluminum electrolytic capacitor, an electric double layer capacitor, and a lithium ion secondary battery were fabricated by the following methods.

[Method for Fabricating Aluminum Electrolytic Capacitor]

The anode aluminum foil and cathode aluminum foil subjected to the etching treatment and the oxide film forming treatment were wound with a separator interposed therebetween to obtain a capacitor element winding. This element winding was impregnated with an electrolyte and placed in a case and then the case was sealed, thereby fabricating an aluminum electrolytic capacitor having a diameter of 10 mm, a height of 20 mm, a rated voltage of 63 V, and a rated capacity of 120 $\mu$F.

[Method for Fabricating Electric Double Layer Capacitor]

An activated carbon electrode and a separator were wound to obtain an electric double layer capacitor element winding. The element winding was housed in a cylindrical aluminum case with a bottom, an electrolytic solution in which tetraethylammonium tetrafluoroborate as an electrolyte was dissolved in a propylene carbonate solvent was injected into the aluminum case, vacuum impregnation was performed, and the aluminum case was sealed with sealing rubber. An electric double layer capacitor having a rated voltage of 2.5 V, a capacity of 300 F, a diameter of 35 mm, and a height of 60 mm was thus fabricated.

[Method for Fabricating Lithium Ion Secondary Battery]

A lithium cobaltate electrode for a lithium ion secondary battery was used as a positive electrode material, a graphite electrode was used as a negative electrode material, and these were wound together with a separator to obtain a lithium ion secondary battery element winding. The element winding was housed in a cylindrical case with a bottom, an electrolytic solution in which lithium hexafluorophosphate as an electrolyte was dissolved in a mixed solvent of ethylene carbonate and diethyl carbonate was injected into the case, and the case was sealed using a press machine. A lithium ion secondary battery having a rated voltage of 3.7 V, a rated capacity of 3000 mAh, a diameter of 18 mm, and a height of 65 mm was thus fabricated.

The properties of the respective electrochemical elements fabricated were measured by the following methods. Incidentally, each electrochemical element was fabricated by 1000 pieces for each example and used in the following property evaluations.

[Impregnation Performance]

The impregnation speed was measured by the following method using the element windings fabricated.

When each element winding was impregnated with the electrolytic solution, the time from the moment at which the electrolytic solution was injected or the element was immersed in the electrolytic solution to the moment at which the capacity reached 80% of the rated electrostatic capacity or rated discharge capacity was measured to evaluate the impregnation performance.

This measurement was performed 20 times for each element winding at the time of element winding fabrication, and the average value thereof was taken as the impregnation time. Incidentally, the measurement was performed without pressure reduction and the like at the time of impregnation.

In the case of the aluminum electrolytic capacitor, those having an impregnation time of 4 minutes or less were judged as "○", those having an impregnation time of more than 4 minutes and 6 minutes or less were judged as "Δ", and those having an impregnation time of more than 6 minutes were judged as "x".

In addition, in the electric double layer capacitor and the lithium ion secondary battery, those having an impregnation time of 10 minutes or less were judged as "○", those having an impregnation time of more than 10 minutes and 15 minutes or less were judged as "Δ", and those having an impregnation time of more than 15 minutes were judged as "x".

[Percentage of Short Circuit Defect]

As the percentage of short circuit defect in the electrochemical element, it was regarded as a short circuit defect in a case in which the charging voltage did not rise to the rated voltage, the number of the electrochemical elements having this short circuit defect was divided by the number of electrochemical elements subjected to the electrostatic capacity measurement, and the percentage thereof was taken as the percentage of short circuit defect.

[Impedance]

The impedance of the aluminum electrolytic capacitor was measured using an LCR meter at a frequency of 1 kHz at 20° C.

[Internal Resistance]

The internal resistance of the electric double layer capacitor was measured by the alternating current (ac) resistance method of "4.6 Internal resistance" prescribed in "JIS C 5160-1 "Fixed electric double layer capacitors for electronic devices Part 1: General rules according to items"".

In addition, the internal resistance of the lithium ion secondary battery was measured in conformity with "8.6.3 Alternating current internal resistance" prescribed in "JIS C 8715-1 "Unit cells and battery systems for industrial lithium secondary batteries-Part 1: Performance requirements"".

[Rate of Change in Capacity Due to Heating]

The rate of change in capacity of the aluminum electrolytic capacitor due to heating was determined by the following method.

The initial electrostatic capacity was measured by the method of "4.7 Electrostatic capacity" prescribed in "JIS C5101-1 "Fixed capacitors for electronic devices Part 1: General rules according to items"".

Next, the aluminum electrolytic capacitor was allowed to still stand (heat treatment) in an environment at 160° C. for 250 hours, and then the electrostatic capacity after the heat treatment was measured by the method described above. Thereafter, the rate of change in capacity due to heating was calculated by the following Equation 1 using the electrostatic capacities before and after the heat treatment.

$$C=\{1-(C1-C2)/C1\}\times 100 \qquad \text{Equation 1:}$$

C: Rate of change in capacity due to heating (%)
C1: Initial capacity (F or mA)
C2: Capacity after heating (F or mA)

The rate of change in capacity of the electric double layer capacitor due to heating was determined by the following method.

The initial electrostatic capacity was measured by the constant current discharge method of "4.5 Electrostatic capacity" prescribed in "JIS C 5160-1 "Fixed electric double layer capacitors for electronic devices"".

Next, the electric double layer capacitor was allowed to still stand (heat treatment) in an environment at 150° C. for 1 hour, and then the electrostatic capacity after the heat treatment was measured by the method described above. Thereafter, the rate of change in capacity due to heating was calculated by Equation 1 using the electrostatic capacities before and after the heat treatment.

The rate of change in capacity of the lithium ion secondary battery due to heating was determined by the following method.

The initial discharge capacity was measured in conformity with "8.4.1 Discharge performance test" prescribed in "JIS C 8715-1 "Unit cells and battery systems for industrial lithium secondary batteries-Part 1: Performance requirements"".

Next, the lithium ion secondary battery was allowed to still stand (heat treatment) in an environment at 150° C. for 1 hour, and then the discharge capacity after the heat treatment was measured by the method described above. Thereafter, the rate of change in capacity due to heating was calculated by Equation 1 using the discharge capacities before and after the heat treatment.

Hereinafter, specific Examples according to the present invention, Comparative Examples, and Conventional Examples will be described.

Incidentally, solvent-spun cellulose fibers were used as a cellulose fiber in the separators of the respective Examples, and the separators were obtained by a papermaking method using a paper machine.

Example 1

Solvent-spun rayon fibers, which were a cellulose fiber, were beaten and subjected to Fourdrinier papermaking to obtain a sheet. The thickness of this sheet was adjusted by soft calendering to obtain a separator having a thickness of 10.0 μm and a density of 0.75 g/cm³.

The average distance between center points of this separator was 12.8 μm, and the standard deviation of the distance between center points was 7.1. In addition, the value obtained by dividing the average distance between center points by the thickness of this separator was 1.28, the fibrillation was 8.3%, and the Bekk smoothness was 1984.2 seconds.

Example 2

Solvent-spun rayon fibers, which were a cellulose fiber, were beaten and subjected to Fourdrinier papermaking to obtain a sheet. The thickness of this sheet was adjusted by soft calendering to obtain a separator having a thickness of 20.0 μm and a density of 0.75 g/cm³.

The average distance between center points of this separator was 16.6 μm, and the standard deviation of the distance between center points was 8.7. In addition, the value obtained by dividing the average distance between center points by the thickness of this separator was 0.83, the fibrillation was 7.2%, and the Bekk smoothness was 1031.2 seconds.

Example 3

Solvent-spun rayon fibers, which were a cellulose fiber, were beaten and subjected to cylinder papermaking to obtain a sheet. The thickness of this sheet was adjusted by soft calendering to obtain a separator having a thickness of 20.0 μm and a density of 0.60 g/cm³.

The average distance between center points of this separator was 24.2 μm, and the standard deviation of the distance between center points was 11.8. In addition, the value obtained by dividing the average distance between center points by the thickness of this separator was 1.21, the fibrillation was 14.8%, and the Bekk smoothness was 596.1 seconds.

Example 4

Solvent-spun rayon fibers, which were a cellulose fiber, were beaten and subjected to Fourdrinier papermaking to obtain a sheet. The thickness of this sheet was adjusted by soft calendering to obtain a separator having a thickness of 20.0 μm and a density of 0.55 g/cm$^3$.

The average distance between center points of this separator was 17.2 μm, and the standard deviation of the distance between center points was 6.8. In addition, the value obtained by dividing the average distance between center points by the thickness of this separator was 0.86, the fibrillation was 10.6%, and the Bekk smoothness was 445.1 seconds.

Reference Example 1

Solvent-spun rayon fibers, which were a cellulose fiber, were beaten and subjected to Fourdrinier papermaking to obtain a sheet. The thickness of this sheet was adjusted by soft calendering to obtain a separator having a thickness of 8.0 μm and a density of 0.75 g/cm$^3$.

The average distance between center points of this separator was 10.2 μm, and the standard deviation of the distance between center points was 6.1. In addition, the value obtained by dividing the average distance between center points by the thickness of this separator was 1.28, the fibrillation was 11.5%, and the Bekk smoothness was 2449.7 seconds.

Reference Example 2

Solvent-spun rayon fibers, which were a cellulose fiber, were beaten and subjected to Fourdrinier papermaking to obtain a sheet. The thickness of this sheet was adjusted by soft calendering to obtain a separator having a thickness of 25.0 μm and a density of 0.55 g/cm$^3$.

The average distance between center points of this separator was 26.5 μm, and the standard deviation of the distance between center points was 11.9. In addition, the value obtained by dividing the average distance between center points by the thickness of this separator was 1.06, the fibrillation was 9.6%, and the Bekk smoothness was 380.9 seconds.

Comparative Example 1

Solvent-spun rayon fibers, which were a cellulose fiber, were beaten and subjected to Fourdrinier papermaking to obtain a sheet. The thickness of this sheet was adjusted by soft calendering to obtain a separator having a thickness of 10.0 μm and a density of 1.05 g/cm$^3$.

The average distance between center points of this separator was 7.5 μm, and the standard deviation of the distance between center points was 5.5. In addition, the value obtained by dividing the average distance between center points by the thickness of this separator was 0.75, the fibrillation was 12.6%, and the Bekk smoothness was 1833.9 seconds.

Comparative Example 2

Solvent-spun rayon fibers, which were a cellulose fiber, were beaten and subjected to Fourdrinier papermaking to obtain a sheet. The thickness of this sheet was adjusted by soft calendering to obtain a separator having a thickness of 30.0 μm and a density of 0.48 g/cm$^3$.

The average distance between center points of this separator was 41.7 μm, and the standard deviation of the distance between center points was 26.3. In addition, the value obtained by dividing the average distance between center points by the thickness of this separator was 1.39, the fibrillation was 13.2%, and the Bekk smoothness was 421.1 seconds.

Comparative Example 3

Solvent-spun rayon fibers, which were a cellulose fiber, were beaten and subjected to Fourdrinier papermaking to obtain a sheet. The thickness of this sheet was adjusted by soft calendering to obtain a separator having a thickness of 15.0 μm and a density of 0.85 g/cm$^3$.

The average distance between center points of this separator was 16.6 μm, and the standard deviation of the distance between center points was 12.9. In addition, the value obtained by dividing the average distance between center points by the thickness of this separator was 1.11, the fibrillation was 15.7%, and the Bekk smoothness was 1789.5 seconds.

Comparative Example 4

Solvent-spun rayon fibers, which were a cellulose fiber, were beaten and subjected to Fourdrinier papermaking to obtain a sheet. The thickness of this sheet was adjusted by soft calendering to obtain a separator having a thickness of 25.0 μm and a density of 0.60 g/cm$^3$.

The average distance between center points of this separator was 22.5 μm, and the standard deviation of the distance between center points was 13.0. In addition, the value obtained by dividing the average distance between center points by the thickness of this separator was 0.90, the fibrillation was 6.5%, and the Bekk smoothness was 558.0 seconds.

Conventional Example 1

Solvent-spun rayon fibers, which were a cellulose fiber, were highly beaten and subjected to Fourdrinier papermaking to obtain a separator having a thickness of 20.0 μm and a density of 0.55 g/cm$^3$.

The average distance between center points of this separator was 18.3 μm, and the standard deviation of the distance between center points was 13.1. In addition, the value obtained by dividing the average distance between center points by the thickness of this separator was 0.92, the fibrillation was 15.3%, and the Bekk smoothness was 321.1 seconds.

Incidentally, this separator was formed only by papermaking and was not subjected to the thickness adjustment.

Conventional Example 2

Solvent-spun rayon fibers, which were a cellulose fiber, were beaten and subjected to Fourdrinier papermaking to obtain a sheet. The thickness of this sheet was adjusted by hard calendering to obtain a separator having a thickness of 10.0 μm and a density of 1.05 g/cm³.

The average distance between center points of this separator was 5.5 μm, and the standard deviation of the distance between center points was 4.3. In addition, the value obtained by dividing the average distance between center points by the thickness of this separator was 0.55 and the fibrillation was 8.0%.

In this separator, the fibers constituting the separator were bound with one another in the form of a film and partially filmed. It was not possible to accurately measure the Bekk smoothness since this filmed place was slightly shrunk and fine wrinkles were generated on the sheet.

Conventional Example 3

A microporous polyethylene film having a thickness of 25.0 μm and a basis weight of 16 g/m² was used as a separator.

This separator was not a separator formed of fibers, and it was not thus possible to measure the average distance between center points, the values calculated using the distance between center points, and the fibrillation. Incidentally, the Bekk smoothness was 6530.9 seconds.

Conventional Example 4

Solvent-spun rayon fibers, which were a cellulose fiber, were beaten and mixed with polyethylene terephthalate fibers having a fiber diameter of 3 μm and a length of 2 mm at a ratio of 70% by mass to 30% by mass, and the mixed fibers were subjected to Fourdrinier papermaking to obtain a sheet. The thickness of this sheet was adjusted by soft calendering to obtain a separator having a thickness of 25.0 μm and a density of 0.60 g/cm³.

The average distance between center points of this separator was 18.0 μm, and the standard deviation of the distance between center points was 12.1. In addition, the value obtained by dividing the average distance between center points by the thickness of this separator was 0.72, the fibrillation was 8.2%, and the Bekk smoothness was 615.0 seconds.

Conventional Example 5

The separator of Example 4 was used as a substrate, and both surfaces of this substrate was coated with an aluminum oxide powder and dried to obtain a separator having a thickness of 25.0 μm and a density of 0.82 g/cm³. Incidentally, a polyvinylidene fluoride binder was used in order to retain the aluminum oxide powder on the substrate.

The separator was one obtained by providing an inorganic layer on the separator of Example 4, and it was not thus possible to measure the average distance between center points, the values calculated using the distance between center points, and the fibrillation. In Table 1, the values of Example 4 were used. In addition, it was not possible to accurately measure the Bekk smoothness since the inorganic powder was gradually detached from the separator during the measurement.

Conventional Example 6

The separator of Conventional Example 3 was used as a substrate, and both surfaces of this substrate was coated with an aluminum oxide powder and dried to obtain a separator having a thickness of 30.0 μm and a density of 0.85 g/cm³. Incidentally, a polyvinylidene fluoride binder was used in order to retain the aluminum oxide powder on the substrate.

The separator was one obtained by providing an inorganic layer on the separator of Conventional Example 3, and it was not thus possible to measure the average distance between center points, the values calculated using the distance between center points, and the fibrillation. In addition, it was not possible to accurately measure the Bekk smoothness since the inorganic powder was gradually detached from the separator during the measurement.

The evaluation results for the separators of the respective Examples, Comparative Examples, and Conventional Examples are presented in Table 1.

Moreover, the evaluation results for the electrochemical elements fabricated using the separators of the respective examples are presented in Table 2.

TABLE 1

| | Separator | | | | | | |
|---|---|---|---|---|---|---|---|
| | Thickness μm | Density g/cm³ | Distance between center points μm | Standard deviation — | Distance/ thickness — | Fibrillation % | Bekk smoothness Seconds |
| Example 1 | 10 | 0.75 | 12.8 | 7.1 | 1.28 | 8.3 | 1984.2 |
| Example 2 | 20 | 0.75 | 16.6 | 8.7 | 0.83 | 7.2 | 1031.2 |
| Example 3 | 20 | 0.60 | 24.2 | 11.8 | 1.21 | 14.8 | 596.1 |
| Example 4 | 20 | 0.55 | 17.2 | 6.8 | 0.86 | 10.6 | 445.1 |
| Reference Example 1 | 8 | 0.75 | 10.2 | 6.1 | 1.28 | 11.5 | 2449.7 |
| Reference Example 2 | 25 | 0.55 | 26.5 | 11.9 | 1.06 | 9.6 | 380.9 |
| Comparative Example 1 | 10 | 1.05 | 7.5 | 5.5 | 0.75 | 12.6 | 1833.9 |
| Comparative Example 2 | 30 | 0.48 | 41.7 | 26.3 | 1.39 | 13.2 | 421.1 |
| Comparative Example 3 | 15 | 0.85 | 16.6 | 12.9 | 1.11 | 15.7 | 1789.5 |
| Comparative Example 4 | 25 | 0.60 | 22.5 | 13.0 | 0.90 | 6.5 | 558.0 |
| Conventional Example 1 | 20 | 0.55 | 18.3 | 13.1 | 0.92 | 15.3 | 321.1 |
| Conventional Example 2 | 10 | 1.05 | 5.5 | 4.3 | 0.55 | 8.0 | — |
| Conventional Example 3 | 25 | 0.64 | — | — | — | — | 6530.9 |
| Conventional Example 4 | 25 | 0.60 | 18.0 | 12.1 | 0.72 | 8.2 | 615.0 |
| Conventional Example 5 | 25 | 0.82 | 17.2 | 6.8 | 0.69 | 10.6 | — |
| Conventional Example 6 | 30 | 0.85 | — | — | — | — | — |

TABLE 2

| | Aluminum electrolytic capacitor | | | | Electric double layer capacitor | | | | Lithium ion secondary battery | | | |
|---|---|---|---|---|---|---|---|---|---|---|---|---|
| | Percentage of short circuit defect % | Impedance mΩ | Impregnation performance | Rate of change in capacity after heating % | Percentage of short circuit defect % | Internal resistance mΩ | Impregnation performance | Rate of change in capacity after heating % | Percentage of short circuit defect % | Internal resistance mΩ | Impregnation performance | Rate of change in capacity after heating % |
| Example 1 | 0 | 113 | ○ | 13 | 0 | 0.35 | ○ | 14 | 0 | 47 | ○ | 24 |
| Example 2 | 0 | 125 | ○ | 11 | 0 | 0.39 | ○ | 10 | 0 | 50 | ○ | 20 |
| Example 3 | 0 | 145 | ○ | 10 | 0 | 0.42 | ○ | 9 | 0 | 54 | ○ | 19 |
| Example 4 | 0 | 140 | ○ | 5 | 0 | 0.45 | ○ | 7 | 0 | 60 | ○ | 17 |
| Reference Example 1 | 0 | 147 | Δ | 9 | 0 | 0.47 | Δ | 11 | 0 | 62 | Δ | 21 |
| Reference Example 2 | 0 | 130 | ○ | 8 | 0 | 0.38 | ○ | 9 | 0.1 | 48 | ○ | 19 |
| Comparative Example 1 | 0 | 210 | X | 16 | 0 | 0.66 | X | 18 | 0 | 87 | X | 28 |
| Comparative Example 2 | 1.2 | 135 | ○ | 22 | 0.9 | 0.38 | ○ | 24 | 1.1 | 37 | ○ | 34 |
| Comparative Example 3 | 0 | 220 | X | 27 | 0 | 0.7 | X | 28 | 0.3 | 91 | X | 38 |
| Comparative Example 4 | 1.0 | 105 | ○ | 24 | 0.8 | 0.32 | ○ | 30 | 0.9 | 45 | ○ | 40 |
| Conventional Example 1 | 0 | 190 | Δ | 21 | 0 | 0.58 | Δ | 21 | 0.4 | 89 | Δ | 31 |
| Conventional Example 2 | 0 | 225 | X | 15 | 0 | 0.72 | X | 16 | 0.3 | 93 | X | 26 |
| Conventional Example 3 | 0 | 245 | X | — | 0 | 0.75 | X | — | 0 | 95 | X | — |
| Conventional Example 4 | 0 | 185 | X | 29 | 0 | 0.57 | X | 20 | 0.1 | 88 | X | 33 |
| Conventional Example 5 | 0 | 190 | ○ | 6 | 0 | 0.57 | ○ | 6 | 0 | 89 | ○ | 16 |
| Conventional Example 6 | 0 | 295 | X | — | 0 | 0.84 | X | — | 0 | 106 | X | — |

As can be seen from Table 2, short circuit defects are not caused in the electrochemical elements of the respective Examples. In addition, the impedance and the internal resistance are decreased as compared with those of the electrochemical elements of Conventional Examples. Moreover, the impregnation performance is all "○", further, the retention rates (100%–rate of change) of the electrostatic capacities of the aluminum electrolytic capacitors and electric double layer capacitors are 80% or more to be favorable, and the retention rates (100%–rate of change) of the discharge capacities of the lithium ion secondary batteries are 70% or more to be also favorable in the respective Examples.

In the separator of Comparative Example 1, the value obtained by dividing the average distance between center points by the thickness is 0.75. Moreover, the impedance and internal resistance of the respective electrochemical elements using the separator of Comparative Example 1 are lower as compared with those of the electrochemical element of Conventional Example 2 in which the fibers are partially bound with one another in the form of a film and integrated but are at the same levels as those of each Conventional Example. In addition, the impregnation performance of the electrochemical element of Comparative Example 1 is "x". It is considered that these are because the value obtained by dividing the average distance between center points by the thickness of the separator of Comparative Example 1 is less than 0.80, and the cellulose stem fibers are pressure-bonded to one another, as a result, the resistance of the separator is increased, and the electrolyte impregnation performance is also diminished.

In the separator of Comparative Example 2, a value obtained by dividing the average distance between center points by the thickness is 1.39. Moreover, in each electrochemical element using the separator of Comparative Example 2, a short circuit defect is caused. In addition, the rate of change in capacity of the aluminum electrolytic capacitor and electric double layer capacitor of Comparative Example 2 after heating is more than 20% and the rate of change in capacity of the lithium ion secondary battery after heating is more than 30%. It is considered that these are because the value obtained by dividing the average distance between center points by the thickness of the separator of Comparative Example 2 is more than 1.35, and the stem fibers are separated from one another, thus the short circuit resistance is diminished. Moreover, as the reason for the large rate of change in capacity, the fact that the electrolyte retention performance of the separator is diminished and the electrolyte is evaporated by the heat treatment is considered.

From the comparison of the respective Examples with Comparative Example 1 and Comparative Example 2, it can be seen that the value obtained by dividing the average distance between center points by the thickness of the separator is preferably in a range of 0.80 to 1.35.

In addition, when Example 1 and Example 3 are compared with one another, the retention rates of capacities of the aluminum electrolytic capacitor and electric double layer capacitor after heating are 10% or more and the retention rate of capacity of the lithium ion secondary battery after heating is 20% or more in Example 1, and the retention rates of electrostatic capacities of the aluminum electrolytic capacitor and electric double layer capacitor are 10% or less and the retention rate of discharge capacity of the lithium ion secondary battery is 20% or less in Example 3. Moreover, when Example 2 and Example 4 are compared with one another, the impedance and internal resistance in Example 2 are lower than those in Example 4 by 10% or more.

From these results, it can be seen that the value obtained by dividing the average distance between center points by the thickness of the separator is more preferably in a range of 0.85 to 1.25.

The separator of Comparative Example 3 has a fibrillation of 15.7%. Moreover, each electrochemical element using the separator of Comparative Example 3 has a fibrillation of 15.3% to be close to that of the separator but has a higher impedance and a higher internal resistance than the electrochemical element of Conventional Example 1. In addition, the impregnation performance of the electrochemical element of Comparative Example 3 is "x". Moreover, the retention rates of capacities of the aluminum electrolytic capacitor and electric double layer capacitor after heating are 20% or more to be high and the retention rate of discharge capacity of the lithium ion secondary battery is 30% or more to be high in Comparative Example 3. It is considered that these are because the fibrillation of the separator of Comparative Example 3 is more than 15%, thus the movement of stem fibers hardly occurs, and the standard deviation of the distance between center points is also increased, as a result, the stem fibers are pressure-bonded to one another, and the resistance of the separator is increased, and the electrolyte impregnation performance and the electrolyte retention performance are also diminished. In the lithium ion secondary battery of Comparative Example 3, a short circuit defect is caused, and it is considered that this is because the standard deviation of the distance between center points is increased, as a result, the homogeneity of the separator is slightly diminished.

The separator of Comparative Example 4 has a fibrillation of 6.5%. In addition, the standard deviation of the distance between center points is 13.0 to be great. Moreover, in each electrochemical element using the separator of Comparative Example 4, a short circuit defect is caused. In addition, the retention rate of electrostatic capacity of the aluminum electrolytic capacitor and the retention rate of capacity of the electric double layer capacitor after heating are 20% or more to be high and the retention rate of capacity of the lithium ion secondary battery after heating is 30% or more to be high in Comparative Example 4. It is considered that these are because the fibrillation of the separator of Comparative Example 4 is less than 7%, the variation in distance between center points is great even when the movement of stem fibers occurs, as a result, the short circuit resistance is not improved, and the electrolyte retention performance is also diminished.

From the comparison of the respective Examples with Comparative Example 3 and Comparative Example 4, it can be seen that the fibrillation of the separator is preferably in a range of 7.0 to 15.0%. In addition, it can be seen that the standard deviation of the distance between center points is preferably 12.0 or less.

The separator of Reference Example 1 has a Bekk smoothness of 2449.7 seconds. Moreover, in each electrochemical element using the separator of the Reference Example 1, a short circuit defect is caused. The impedance and internal resistance of each electrochemical element are slightly larger than those in Examples but are decreased as compared with the levels of those in Conventional Examples. The rate of change in capacity of the respective electrochemical elements after heating is also higher than that in the respective Examples but is at a level at which there is no problem.

On the other hand, the Bekk smoothness of the separator of Conventional Example 3 is 6530.9 seconds to be significantly high, and the impedance and internal resistance of the electrochemical elements using this separator are also large.

From the comparison of Reference Example 1 with the respective Examples and Conventional Examples, it can be seen that the Bekk smoothness is preferably 2500 seconds or less and more preferably 2000 seconds or less.

The separator of Reference Example 2 has a Bekk smoothness of 380.9 seconds. In the aluminum electrolytic capacitor and electric double layer capacitor using this separator, a short circuit defect is not caused and the impedance and the internal resistance are also at the same levels as those in Examples to be favorable. However, in the lithium ion secondary battery using this separator, a short circuit defect is caused although only slightly.

From the comparison of Reference Example 2 with the respective Examples, it can be seen that the short circuit resistance of the separator can be further improved if the Bekk smoothness is 400 seconds or more.

The separator of Conventional Example 1 is not subjected to thickness adjustment processing, but the fibers are highly refined in order to enhance the compactness, and the fibrillation of the separator is 15.3%. Moreover, the stem fibers constituting this separator have not moved.

From the comparison of Conventional Example 1 with the respective Examples, it can be seen that the use of the separator of the present invention makes it possible to decrease the percentage of short circuit defect and the resistance of the electrochemical elements, to improve the impregnation performance of the electrochemical elements, and to decrease the rate of change in capacity of the electrochemical elements.

In the separator of Conventional Example 2, the value obtained by dividing the average distance between center points by the thickness is 0.55. This is because the fibers constituting the separator are excessively compressed and are partially bound with one another in the form of a film and integrated, and the impedance and internal resistance of the electrochemical element of Conventional Example 2 are high even when being compared with those of the electrochemical elements of the respective Examples and Comparative Example 1. In addition, the impregnation performance of the electrochemical element of Conventional Example 2 is "x".

The separators of Conventional Example 3 and Conventional Example 6 are microporous polyethylene membranes. The separator of Conventional Example 6 is obtained by subjecting the separator of Conventional Example 3 to inorganic coating in order to enhance the heat resistance. However, both Conventional Example 3 and Conventional Example 6 do not function as an electrochemical element after the test of the rate of change in capacity after heating. On the other hand, the electrochemical elements of the respective Examples operate without any problem although a slight decrease in capacity due to the heat treatment is observed.

From this fact, it can be seen that the heat resistance of the electrochemical element can be improved by use of the separator formed of cellulose fibers of the present invention.

In addition, the separator of Conventional Example 4 contains a synthetic fiber. From the comparison of Conventional Example 4 with the respective Examples, it can be seen that the electrolyte impregnation performance can be improved by use of the separator formed of cellulose fibers of the present invention and the rate of change in capacity of the electrochemical element can also be decreased by enhancing the electrolyte retention performance.

In the case of the separators coated with an inorganic powder of Conventional Example 5 and Conventional Example 6, it was not possible to accurately measure the Bekk smoothness since the inorganic powder was gradually detached from the separators during the measurement.

From this fact, there is a concern that the inorganic powder is gradually detached from the separators even when such separators are used in electrochemical elements as a separator.

In addition, the separators of the respective Examples have a thickness equal to or thinner than that of a number of separators of Conventional Examples but do not cause short circuit defects in spite of a thin thickness.

From this fact, the use of the separator of the present invention can also contribute to the thinning of a separator and further to the downsizing of an electrochemical element.

As described above, it is possible to improve the short circuit resistance of the separator and to thin the thickness of the separator without impairing the resistance, electrolyte impregnation performance, and electrolyte retention performance of the separator by the use of the separator of the present invention.

In the above, examples have been described in which the separator of the present embodiment is used in an aluminum electrolytic capacitor, an electric double layer capacitor, and a lithium ion secondary battery.

In the electrochemical element according to the present invention, the electrode material, the electrolyte material, other members and the like are not required to be particularly limited, and various materials can be used.

In addition, the separator for an electrochemical element of the present invention can also be applied to electrochemical elements other than those described in the present embodiment, for example, electrochemical elements such as a lithium ion capacitor, a lithium primary battery, a sodium ion secondary battery, a sodium sulfur secondary battery, a magnesium ion secondary battery, and a magnesium sulfur secondary battery.

REFERENCE SIGNS LIST

10 Separator
11 Cellulose stem fiber
12 Fibril

The invention claimed is:

1. A separator for an electrochemical element consisting of a solvent-spun cellulose fiber, wherein
    a value obtained by dividing an average value for a distance between a center point of a cellulose stem fiber constituting the separator and a center point of another cellulose stem fiber nearest to the cellulose stem fiber by a thickness of the separator is 0.80 to 1.35.

2. The separator for an electrochemical element according to claim 1, wherein a fibrillation of the separator is 7.0 to 15.0%.

3. An electrochemical element comprising the separator for an electrochemical element according to claim 1.

4. The electrochemical element according to claim 3, wherein the electrochemical element is one selected from an aluminum electrolytic capacitor, an electric double layer capacitor, a lithium ion capacitor, a lithium ion secondary battery, a sodium ion secondary battery, a sodium sulfur secondary battery, a magnesium ion secondary battery, or a magnesium sulfur secondary battery.

5. An electrochemical element comprising the separator for an electrochemical element according to claim 2.

6. The electrochemical element according to claim 5, wherein the electrochemical element is one selected from an aluminum electrolytic capacitor, an electric double layer capacitor, a lithium ion capacitor, a lithium ion secondary battery, a sodium ion secondary battery, a sodium sulfur secondary battery, a magnesium ion secondary battery, or a magnesium sulfur secondary battery.

\* \* \* \* \*